United States Patent [19]

Varden

[11] Patent Number: 5,141,263
[45] Date of Patent: Aug. 25, 1992

[54] FLUID LINE CONNECTOR FITTING WITH LONGITUDINAL RELEASE MECHANISM

[76] Inventor: Arnold Varden, 8 Ottaway Avenue, Barrie, Ontario, Canada, L4M 2W7

[21] Appl. No.: 521,486

[22] Filed: May 10, 1990

[51] Int. Cl.$^5$ .............................................. F16L 37/00
[52] U.S. Cl. ..................... 285/314; 285/308; 285/243; 285/307; 285/315; 285/319; 285/921
[58] Field of Search ............... 285/149, 315, 321, 343, 285/314, 307, 243, 308, 319, 921

[56] References Cited

U.S. PATENT DOCUMENTS

| | | | |
|---|---|---|---|
| 3,724,882 | 4/1973 | Dehar | 285/243 |
| 3,731,955 | 5/1973 | Borsan et al. | 285/307 X |
| 3,773,360 | 11/1973 | Timbers | 285/307 |
| 4,219,222 | 8/1980 | Brusadin | 285/315 |
| 4,610,468 | 9/1986 | Wood | 285/307 X |
| 4,660,803 | 4/1987 | Johnston et al. | 285/315 |
| 4,790,571 | 12/1988 | Montamari et al. | 285/315 |
| 4,796,856 | 1/1989 | Munini | 285/315 |
| 4,903,942 | 2/1990 | Licciardello et al. | 285/315 |

Primary Examiner—Randolph A. Reese
Assistant Examiner—Timothy Aberle
Attorney, Agent, or Firm—Bereskin & Parr

[57] ABSTRACT

A fluid line connector fitting is provided which has first and second generally tubular members, one end of the second member being slidably receivable within the first member. Releasable locking means are also provided to prevent withdrawal of the second member from the first member. The releasable locking means are releasable by the action of a release means which reacts to longitudinal movement of the second member toward the first member.

9 Claims, 3 Drawing Sheets

FLUID LINE CONNECTOR FITTING WITH LONGITUDINAL RELEASE MECHANISM

FIELD OF THE INVENTION

This invention relates to connector fittings for attaching a fluid line to another component in a fluid system.

BACKGROUND OF THE INVENTION

In fluid systems, such as systems for delivering air or hydraulic fluid, it is frequently necessary to attach flexible tubing which acts as a conduit for the fluid to a component of the system which may receive fluid from the tubing or act as a fluid source for the tubing. Various connectors for accomplishing this have been devised. Such connectors typically have a first member threadedly connectable to the component and provision for attaching the tubing to the first member. Prior devices typically embody a compression fitting which interacts with the first member to cause the tubing to be pressed against the first member. The compression fitting may also include a ferrule at the junction of the first and second members and the tubing.

Ideally, a fluid line connector fitting should give a fluid tight seal, allow for easy disconnection of the tubing from the first member and be reusable many times over without significant deterioration of its fluid sealing capabilities. Prior fluid line connector fittings have not optimized all three of these parameters simultaneously. The prior fluid line connector fittings which form a fluid tight seal have typically required tools for connection or considerable force to remove the tubing from the first member. Prior fluid connector fittings which are easy to disassemble have typically not provided optimal fluid sealing capabilities.

SUMMARY OF THE INVENTION

A fluid line connector fitting is provided comprising:
a first generally tubular member;
a second generally tubular member one end of which is slideably receivable within said first said generally tubular member;
releasable locking means for connecting said first and second members to prevent withdrawal of said second member from said first member; and
release means reacting to longitudinal movement of said second member towards said first member for releasing said releasable locking means.

Further objects and advantages will appear from the following description, taken together with the accompanying drawings.

DETAILED DESCRIPTION OF PREFERRED EMBODIMENT

Figure 1:
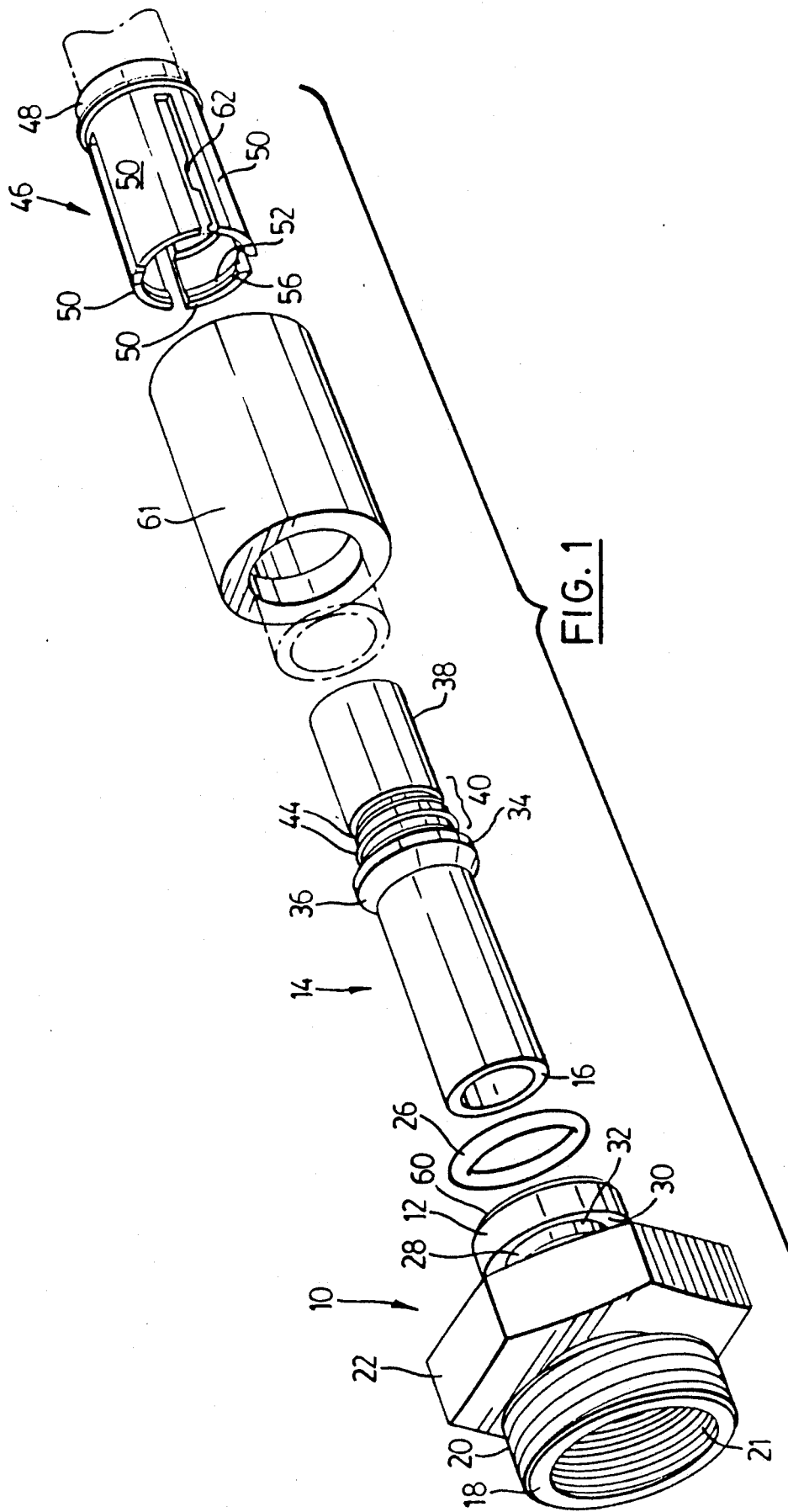
FIG. 1 shows an exploded view of a fluid line connector fitting according to the present invention.

Referring to the drawings, a first tubular member is generally indicated by reference 10. The first member 10 has a receiving end 12 which slideably receives an insertion end 16 of a second generally tubular member 14.

The first member 10 has a connecting end 18 opposite the receiving end 12. The connecting end 18 is provided with external threads 20 and internal threads 21 which independently act as a means for attaching the first member 10 to a correspondingly threaded fluid system component (not shown). Such attachment may be further facilitated by providing a suitable tool engaging portion 22 intermediate the connecting and receiving ends, 18 and 22 respectively. The tool engaging portion 22 may, as shown, simply be hexagonal in cross-section so that it may be gripped by a wrench.

Figure 2:
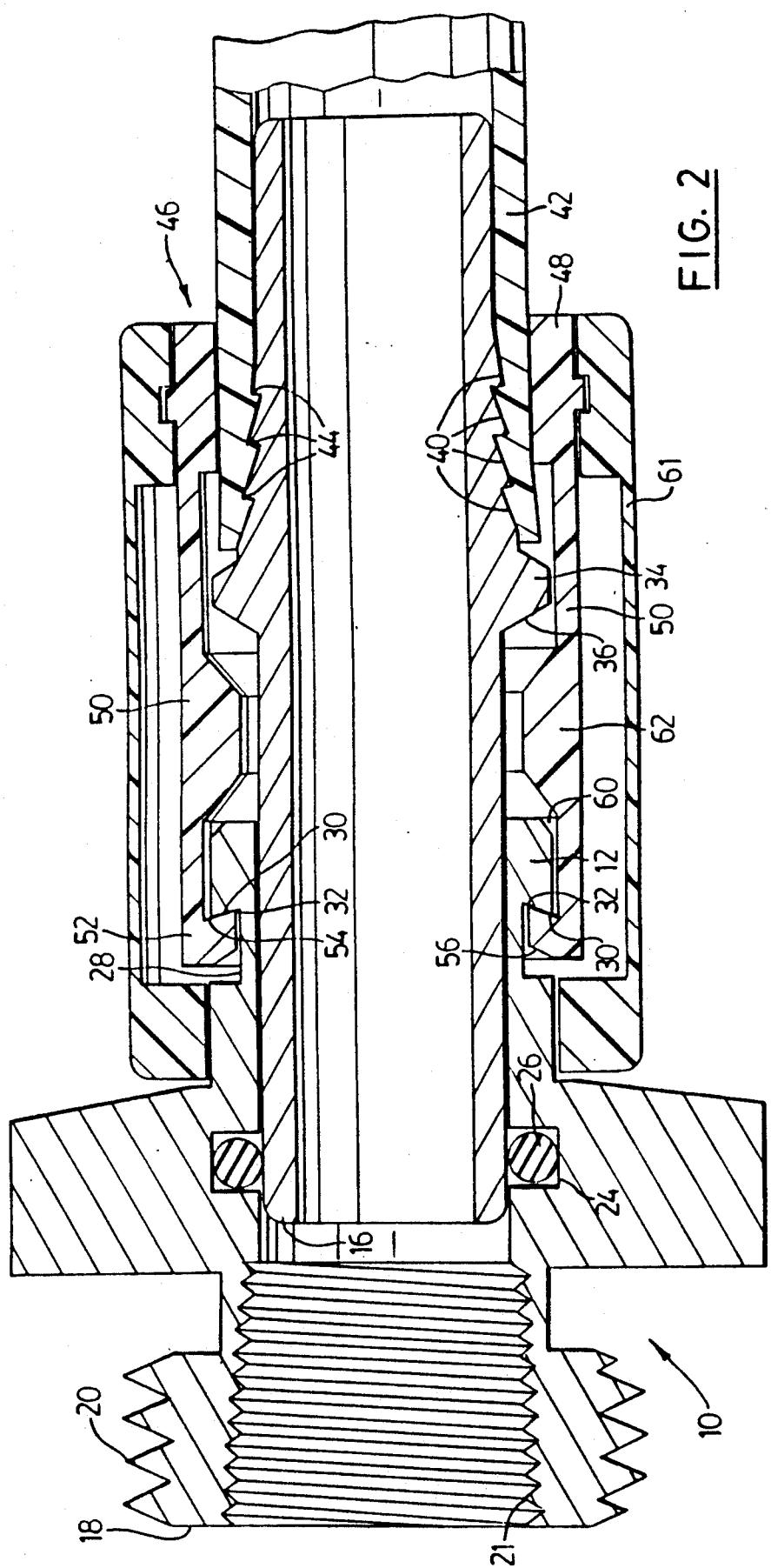
FIG. 2 is a cross-sectional view through a fluid line connector fitting according to the present invention showing the locking mechanism engaged.

Referring to FIG. 2 the first member 10 is provided with a circumferential groove 24 approximately midway along the bore and extending around the bore. The groove 24 receives an 0-ring 26 which acts as a fluid seal between the first member 10 and the insertion end 16 of the second member 14.

Adjacent the receiving end 12 of the first member 10 is a circumferential recess 28. The recess 28 has an outermost face 30 towards the receiving end 12. The outer face 30 includes an undercut 32 extending toward the receiving end 12 so that the outer face 30 of the recess slopes away from the receiving end 12 with the radially innermost portion of the outer face 30 being closest to the receiving end 12. As will be discussed in more detail below, the undercut 32 helps to resist longitudinal separation of the fluid line connector. Although making the outer face 30 of the recess 28 generally perpendicular to the centre line of the bore of the first member 10 will provide some resistance against longitudinal separation, preferably the outer face 30 of the recess 28 should have an undercut slope of approximately 2½ degrees from the perpendicular.

Referring now to the second member 14, the second member 14 has a ridge 34 extending circumferentially therearound intermediate its ends. The ridge 34 has a bevelled face 36 tapering towards the insertion end 16. The bevelled face 36 and ridge 34 act in combination as a cam for part of a release mechanism which will be described in more detail below.

The end of the second member 14 opposite the insertion end 16 and identified by reference 38 has a series of frustro-conical ridges 40 extending therearound. The ridges 40 extend generally at right angles from the second member 14 and taper toward the end 38. The ridges 40 act to secure a resilient tube 42 mounted over the end 38 to the second member 14. Each of the ridges 40 has an apex 44 and at its furthest distance from the centre line of the second member 14. The diameter of each ridge 40 measured at the apex 44 is slightly greater than the diameter of the remaining ridges toward the end 38. Accordingly, a tube mounted over the ridges 40 will flare slightly toward the insertion end 16. The purpose of this flaring is discussed in more detail below.

The first and second members 10 and 14 respectively are connected by a sleeve 46 which acts as a locking means preventing longitudinal separation of the first and second members, 10 and 14. The sleeve 46 has a generally tubular first end 48 and a plurality of resilient retaining members 50 extending from it. The resilient members 50 are generally parallel to the bore of the sleeve 46. Each of the retaining members 50 has a tab 52 extending radially inwardly therefrom at the end opposite the first end 48. The tab 52 is contoured to engage the recess 28 at the receiving end 12 of the first member 10. Accordingly, the tab has an inner face 54 which generally slopes toward the first end 48 of the sleeve and engages the undercut 32 of the outer face 30 of the recess 28. Each of the tabs 52 has a bevelled outer surface 56 sloping toward the first end 48 of the sleeve 46. The bevelled outer surface 56 engages a similarly sloped chamfer 60 at the receiving end 12 of the first member 10 to urge the tabs over the receiving end 12 by resiliently deforming the retention members 50 during mounting of the sleeve 46 onto the first member 10.

Figure 3:
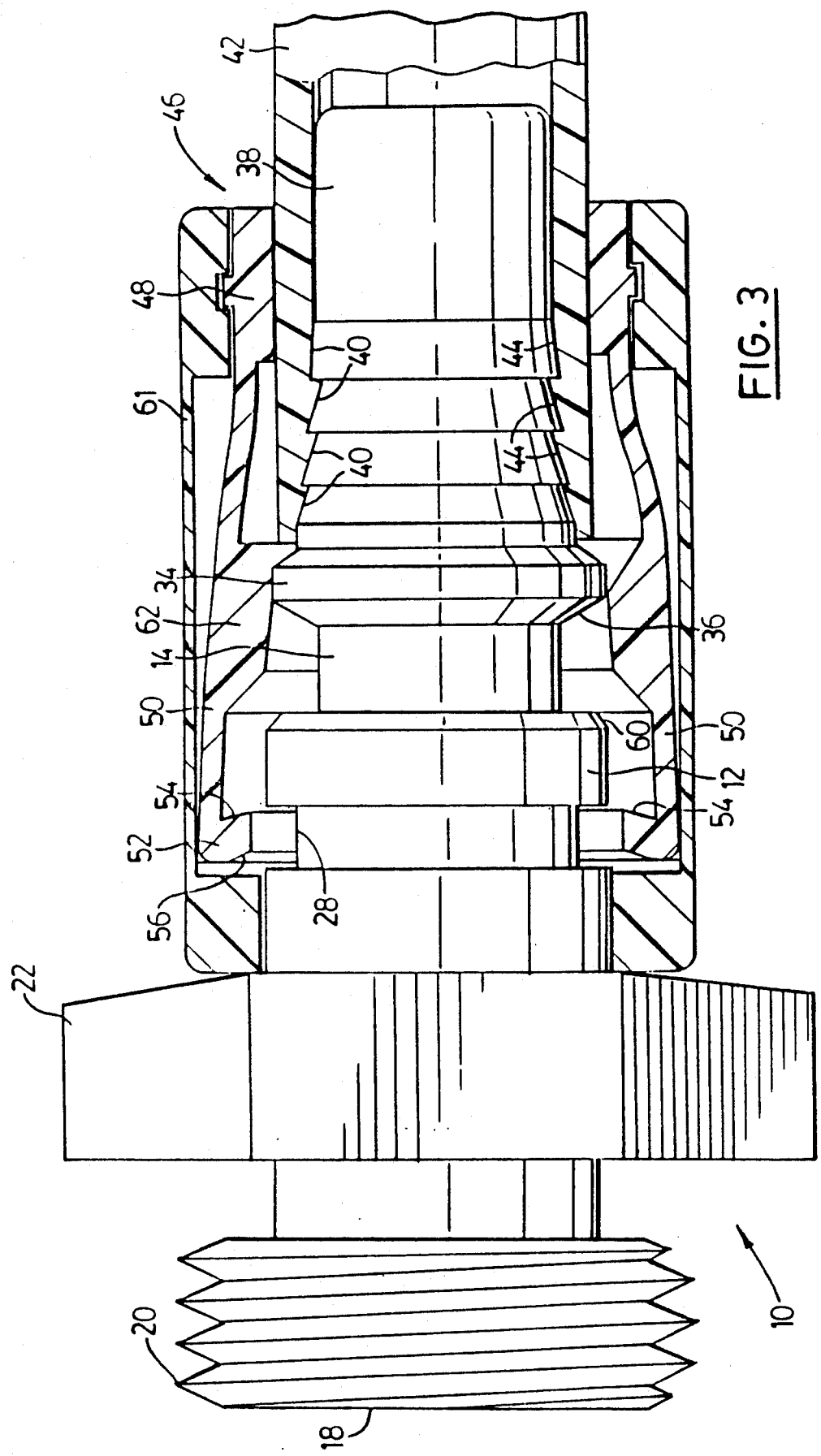
FIG. 3 is a partial sectional view showing the fluid line connector of FIG. 2 with the locking mechanism disengaged.

The retention members 50 are provided with a cam follower 62 extending inwardly from the resilient members 50 intermediate the first end 48 and the tabs 52. The cam follower 62 has a generally trapezoidal cross section and acts as another part of the release mechanism. The cam follower 62 reacts to movement of the ridge or cam 34 longitudinally through the sleeve 46. Accordingly, moving the second member 14 toward the first member 10 causes the ridge 34 to strike the cam follower 62 thereby resiliently deforming the retention members 50 to urge the tabs 52 out of the recess 28. This can be seen by comparing FIGS. 2 and 3.

Movement of the second member 14 away from the first member 10 is limited by the above described flare on the tube 42 caused by the sequentially increasing diameter ridges 40 on the second member 14. The outer surface of the tube engages the interior of the first end 48 to limit displacement of the tube 42 with the second member 14 away from the first member 10. Should the tube not have adequate wall thickness to properly engage the bore of the first end 48, the bore of the first end 48 may be made of a smaller diameter than the ridge 34 of the sleeve so that the ridge 34 will strike the first end 48 to prevent removal of the second member 14 from the first member 10.

Referring to FIG. 2, in order to effect removal of the second member from the first member, the second member is urged toward the first member so that the ridge 34 strikes the cam follower 62 to lift the tabs 52 out of the recess 28. In this position the sleeve in combination with the tube 42 and second member 14 may be simultaneously detached from the first member 10.

A coaxial outer sleeve 61 is also provided around the sleeve 46 to protect the retention members 50.

It will be appreciated that the present invention has several advantages over prior art devices. Firstly, sealing is generally achieved by the O-ring 26 extending between the first member 10 and second member 14. Accordingly, sealing is not made directly between the first member 10 and the tube 42 so that separation of the connector does not require removal of the tube 42 from any of the connector components. The first member and second member 14 may be made from relatively durable materials, such as brass, so that repeated insertion and removal will not cause significant wear on the members themselves and the O-ring 26 may be replaced relatively simply should it be damaged or worn.

Another feature of the device of the present invention is that attempting to pull the tube away from the first member 10 will result in the bore of the first end 48 of the sleeve 46 pressing the tube 42 more tightly toward the ridges 40 to counteract any tendency of the tube to pull off the ridges 40. Also, by virtue of the undercut 32 of the first face 30 of the recess 28 and the corresponding inner face 54 of the tab, urging of the sleeve 46 away from the first member 10 causes the tab to be drawn toward the interior of the recess 28 to prevent slippage of the tab out of the recess 28.

The sleeve 46 and the outer sleeve 61 may be made from a resilient material such as plastic.

It is to be appreciated that what has been described is a preferred embodiment of the present invention. Variations may be apparent to those skilled in the art in adapting the present invention to specific circumstances. Such variations may include the particular angle of the undercut, the cam and cam follower profile and the material selected for the various components. Furthermore, although a "resilient" retention member has been shown, the word resilient should be interpreted broadly enough to include hinged retention members which are resiliently biased toward the centre of the sleeve 46 by springs or the like. Such variations and other variations which are within the spirit and scope of the present invention as set forth in the appended claims are deemed to form part of the present invention.

It may be desirable, particularly in high pressure applications, to retain the tube 42 on the end 38 of the second member 14 by means other than ridges 40. For example, the end 38 may be threaded so as to receive a further threaded fitting on the tube 42. Furthermore, in high pressure applications it may be desirable to replace the O-ring 26 with a different seal, for example, a cup type seal having a generally U-shaped cross-section.

I claim:

1. A fluid line connector fitting comprising:

a first generally tubular member;

a second generally tubular member, one end of which is slidably receivable within said first generally tubular member and the opposite end of which is connectable to a fluid line;

releasable locking means for connecting said first and second members to prevent withdrawal of said second member from said first member;

release means reacting to longitudinal movement of said second member towards said first member for releasing said releasable locking means;

a generally tubular sleeve carrying a part of said releasable locking means and a part of said release means and having a generally tubular first end for extending around said fluid line and at least one resilient member extending away from said first end;

a further part of said releasable locking means being carried by said first member; and a further part of said release means being carried by said second member.

2. A fluid line connector fitting comprising:

a first generally tubular member;

a second generally tubular member, one end of which is slidably receivable within said first generally tubular member and the opposite end of which is connectable to a fluid line;

releasable locking means for connecting said first and second members to prevent withdrawal of said second member from said first member;

release means reacting to longitudinal movement of said second member towards said first member for releasing said releasable locking means;

a generally tubular sleeve carrying a part of said releasable locking means and a part of said release means and having a generally tubular first end for extending around said fluid line and at least one resilient member extending away from said first end;

a further part of said releasable locking means being carried by said first member;

a further part of said release means being carried by said second member;

said releasable locking means including at least one tab extending inwardly from said resilient member and a corresponding recess extending into the outer surface of said first member for receiving each said tab; and said release means including at least one cam extending outwardly from along the length of said second member which acts against a cam follower extending inwardly from said sleeve.

3. A fluid line connector fitting as claimed in claim 2 wherein:

the outer face of each said tab has a bevelled face which engages an edge of said first member to urge each said tab radially outwardly when said sleeve is urged toward said first member;

the inner face of each said tab slopes toward said first end of said sleeve;

the outermost face of each said recess has an undercut which engages said inner face of said tab to prevent said tab from expanding radially outwardly when said sleeve is urged away from said first member.

4. A fluid line connector fitting as claimed in claims 1, 2 or 3 wherein the end of said sleeve surrounding said fluid line and said second member are provided with co-operative longitudinal stop means which prevent withdrawal of said fluid line and said second member through said first end.

5. A fluid line connector as claimed in claims 1, 2 or 3 wherein:

the end of said sleeve surrounding said fluid line the portion of said second member surmounted by said tube are provided with cooperating longitudinal stop means which prevent withdrawal of said fluid line and said second member through said first end, said longitudinal stop means comprising respective cooperating surfaces on the interior of said sleeve and on the exterior of a fluid line mounted on and frictionally engaging said second member, at least one of said surfaces being tapered.

6. A fluid line connector fitting as claimed in claims 1, 2 or 3 wherein the end of said first member facing away from said second member is threaded for connection with a correspondlingly threaded member.

7. A fluid line connector fitting as claimed in claims 1, 2 or 3 further having a seal extending between said first and second members.

8. A fluid line connector fitting as claimed in claims 1, 2 or 3 wherein the end of said first member facing away from said second member is threaded for further connection onto a correspondlingly threaded member and a seal extends between said first and second members.

9. A fluid line connector as claimed in claims 1, 2 or 3 wherein:

the end of said sleeve surrounding said fluid line and the portion of said second member surmounted by said tube are provided with cooperating longitudinal stop means which prevent withdrawal of said tube and said second member through said first end, said longitudinal stop means comprising respective cooperating surfaces on the interior of said sleeve and on the exterior of a tube mounted on and frictionally engaging said second member, at least one of said surfaces being tapered; and a seal extends between said first and second members.

* * * * *